Jan. 29, 1963 J. R. BIARD ETAL 3,076,152

STABILIZED DUTY CYCLE MODULATED MULTIVIBRATOR

Filed Oct. 29, 1959

INVENTORS
J. R. Biard &
Walter T. Matzen

BY Stevens, Davis, Miller & Mosher
ATTORNEYS

United States Patent Office 3,076,152

Patented Jan. 29, 1963

3,076,152

STABILIZED DUTY CYCLE MODULATED MULTIVIBRATOR

James R. Biard and Walter T. Matzen, Richardson, Tex., assignors to Texas Instruments Incorporated, Dallas, Tex., a corporation of Delaware Filed Oct. 29, 1959, Ser. No. 849,539
5 Claims. (Cl. 331—113)

The present invention relates to multivibrator circuits, and more particularly to a multivibrator circuit in which the duty cycle may be varied in accordance with an input signal.

An emitter or cathode-coupled multivibrator circuit is employed as the oscillatory element of the duty cycle modulation circuit of the present invention. In an emitter-coupled multivibrator, a capacitor is connected between the emitter electrodes of two transistors and the base electrode of one transistor is connected to the collector electrode of the other transistor, the other transistor having its base returned to a source of reference potential such as ground. In operation the transistors alternately conduct to generate the oscillations of the circuit. The voltage on the emitter of the transistor which is not conducting is dependent upon the voltage across the capacitor intercoupling the two emitter electrodes, and the charge on this capacitor is continuously changing as a result of the flow of a portion of the current from the conducting transistor. When the voltage on the emitter of the non-conducting transistor reaches that of the base electrode, this transistor starts conducting. Due to regenerative action through the base collector circuit of the two transistors, the previously conducting transistor then stops conducting and the previously non-conducting transistor conducts fully. The charge on the capacitor then starts to change in the opposite direction. This action continues until the charge is sufficiently changed to cause the potential of the emitter electrode of the now non-conducting transistor to equal that of the base electrode, in which case switching again occurs.

The frequency of the circuit is determined by the time of the charging and discharging of the capacitor, and a frequency modulator may be developed by varying the charging or discharging time of the capacitor as a function of an input voltage. Such a circuit forms the subject matter of a copending application Serial No. 841,552, filed on September 22, 1959, by Walter T. Matzen entitled "Frequency Modulated Multivibrator" and assigned to the assignee of the present invention. In the circuit of the copending application, the emitter electrode of one transistor is connected to a normally constant current load, which is variable in accordance with an input signal. In this manner, the charging current of the capacitor is made a value which can be varied in accordance with an input signal. As a result of this control of charging current during one state of conduction of the multivibrator, the duration of one complete cycle is variable, and therefore the frequency is variable.

In the circuit above described, the duty cycle of the oscillator varies with changes in frequency. The duty cycle can be made constant by making the voltage swing across the capacitor constant and connecting the emitter electrodes of both transistors to constant current loads which are both variable in the same direction in accordance with an input signal. Such a circuit is the subject matter of the copending application Serial No. 841,551, filed on September 22, 1959, by J. R. Biard entitled "Frequency Modulated Multivibrator With a Constant Duty Cycle" and assigned to the assignee of the present invention.

The basic multivibrator circuit can be made a duty cycle modulator by using a differential amplifier to provide constant current loads to control the charging and discharging currents of the capacitor, with the constant current loads differentially variable in accordance with an input signal. Such a circuit is the subject matter of a copending application Serial No. 841,553, filed on September 22, 1959, by J. R. Biard entitled "Duty Cycle Modulated Multivibrator" and assigned to the assignee of the present invention.

The present invention is an improvement over the circuit of the aforesaid copending application of J. R. Biard entitled "Duty Cycle Modulated Multivibrator." According to the invention, voltage proportional to the duty cycle of the output waveform is generated. This voltage is applied as negative feedback to the differential amplifier. This feedback improves the stability of the circuit and improves the linearity of the relationship between duty cycle and the input signal voltage.

Further objects and advantages will become apparent as the following detailed description of a preferred embodiment unfolds and when taken in conjunction with the drawings wherein.

Figure 1:
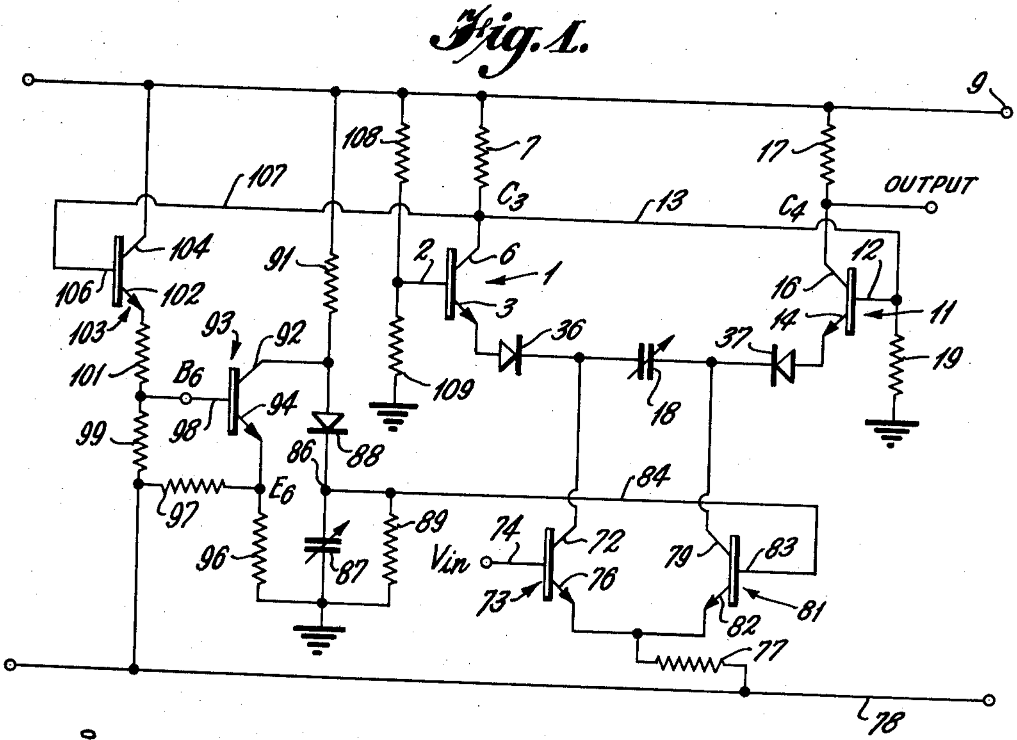
FIGURE 1 shows the circuit of the invention.

As shown in FIGURE 1, the multivibrator circuit comprises two NPN transistors 1 and 11. The transistor 1 is provided with a collector 6, a base 2, and an emitter 3 and the transistor 11 is provided with a collector 16, a base 12, and an emitter 14. The emitters 3 and 14 are connected to the opposite terminals of a capacitor 18 through diodes 36 and 37, respectively, with the anodes of the diodes 36 and 37 being connected to the emitters. The junction between the diode 36 and the capacitor 18 is connected to collector 72 of an NPN transistor 73. The junction between the diode 37 and the capacitor 18 is connected to collector 79 of an NPN transistor 81. Emitter 76 of transistor 73 is connected directly to emitter 82 of transistor 81 and to a negative source of potential 78 through a resistor 77. The input signal voltage is connected directly to base 74 of the transistor 73. A source of positive potential is connected to the collector 6 of transistor 1 through a resistor 7 and to the collector 16 of transistor 11 through a resistor 17 to provide the collector voltages for these transistors. The output voltage from the circuit is taken from the collector 16 of transistor 11. The base 2 of transistor 1 is connected to the positive source 9 through a resistor 108 and to ground through a resistor 109. The collector 6 of transistor 1 is directly connected to the base 12 of transistor 11 by conductor 13, which is connected to ground through a resistor 19. The collector 6 of transistor 1 is connected directly to base 106 of NPN transistor 103 by conductor 107. Collector 104 of the transistor 103 is connected directly to the positive source 9. Emitter 102 of transistor 103 is connected to the negative source 78 through a series circuit of resistors 101 and 99. The junction between the resistors 101 and 99 is connected directly to base 98 of an NPN transistor 93. Collector 92 of transistor 93 is connected to the positive source 9 through a resistor 91 and emitter 94 of transistor 93 is connected to the negative source 78 through a resistor 97. The emitter 94 is also connected to ground through resistor 96. The collector 92 of transistor 93 is connected through a diode 88 to one side of a capacitor 87 with the anode of the diode 88 being connected to the collector 92. The other side of the capacitor 87 is connected to ground. A resistor 89 shunts the capacitor 87. The junction between the capacitor 87 and the diode 88 is connected directly to base 83 of the transistor 81 by a conductor 84.

The operation of the circuit is similar to that of the circuit described in the aforesaid copending applications. The transistors 1 and 11 alternately conduct to generate the oscillations of the circuit. When the transistor 1 is conducting, current flows from the source 9 through resistor 7, transistor 1, and diode 36 to the junction between capacitor 18 and the collector 72 of transistor 73. The current divides at this junction with a portion flowing to the capacitor 18 and the remainder flowing to the collector 72 of transistor 73. The current flowing to the capacitor 18 causes an equal current to flow out from the other side of capacitor 18 to the collector 79 of transistor 81. At this point in the cycle, the capacitor 18 will be charged in such a direction that the current flowing into and out of the capacitor 18 discharges the capacitor 18. Because of the voltage drop through the resistor 7, the collector 6 of transistor 1 will be at a relatively low potential, which is applied to the base 12 of the transistor 11. The emitter 14 of the transistor 11 will be more positive than the base 12 due to the voltage across the charged capacitor 18, and thus the transistor 11 will be maintained in a non-conducting state during this part of the cycle. The capacitor 18 will continue to discharge in this manner until the potential at the emitter 14 of transistor 11 reaches that of the base 12, thus causing the transistor 11 to start conducting. The current from the emitter 14 of the transistor 11 opposes that part of the current flowing from the emitter 3 of transistor 1 into the capacitor 18. Therefore, when the transistor 11 starts conducting it causes a rise in the potential of the collector 6 of transistor 1. This rise in potential is applied to base 12 of the transistor 11 causing an increase in the current flowing through transistor 11 further decreasing the current flow through transistor 1. Thus the action is cumulative and the transistor 11 is quickly switched into a fully conducting condition and the transistor 1 is switched to a fully non-conducting condition. The current now flows from the source 9 through resistor 17, the transistor 11, and the diode 37 and divides, a portion flowing into the capacitor 18 and the remainder flowing to the collector 79 of transistor 81. The current flowing into the capacitor 18 causes an equal current to flow out of the other side of capacitor 18 to the collector 72 of transistor 73. This current flowing into and out of capacitor 18 causes the capacitor 18 to recharge. As the capacitor 18 recharges, the voltage across it increases and this action causes a decrease in the potential at the emitter 3 of the transistor 1. The charging of capacitor 18 continues until the potential at the emitter 3 of transistor 1 reaches the potential of the base 2, at which time the transistor 1 begins again to conduct. When the transistor 1 starts to conduct the potential at the collector 6 drops. This drop in potential is applied to the base 12 of transistor 11, causing the current through transistor 11 to decrease. This action causes the emitter potential of the transistor 11 to fall. This drop in potential is applied to the emitter 3 of transistor 1 by the capacitor 18 causing an increase in the current through transistor 1. Thus the action is cumulative and the transistor 1 is switched quickly to a fully conducting condition and the transistor 11 is switched quickly to a fully non-conducting condition. A portion of the current flowing through transistor 1 again starts to discharge the capacitor 18 and the cycle repeats itself ad infinitum.

The circuit connections of the transistors 73 and 81 cause them to operate as normally constant currents loads to the charging and discharging currents of capacitor 18. The values of these currents are differentially variable in accordance with the input signal voltage. When the signal voltage applied to the base 74 of transistor 73 increases, the current through the transistor 73 will increase. At the same time, because of the connection between the emitters 76 and 82, the current through transistor 81 will decrease. This action will cause the duty cycle to be altered so that the duration of that part of the cycle in which transistor 1 conducts increases and the duration of that part of the cycle in which transistor 11 conducts decreases. Conversely, when the signal applied to the base 74 decreases, the current through transistor 73 will decrease and the current through transistor 81 will increase. Therefore the duty cycle will be altered in the opposite direction so that the duration of that part of the cycle in which transistor 1 conducts will decrease and the duration of that part of the cycle in which transistor 11 conducts will increase.

The signal appearing on the collector electrode 6 of the transistor 1 drives the base 98 of transistor 93 through the emitter follower buffer stage comprising transistor 103. This action causes the transistor 93 to alternately cut off and saturate with a duty cycle equal to that of the output signal generated at the collector 16 of transistor 11. When the transistor 93 is non-conducting, the capacitor 87 is charged from the source 9 through resistor 91 and diode 88. When the transistor 93 saturates, the diode 88 is reverse biased and the capacitor 87 discharges through resistor 89. The average voltage across the capacitor 87 is very nearly proportional to the duty cycle. This voltage is applied to the base 83 of transistor 81. The capacitor 87 has a large capacitance to provide the necessary smoothing to the voltage.

The voltage applied to the base 83 of transistor 81 acts as a negative feedback opposing the effect of the input signal voltage applied to the base 74 of transistor 73. This negative feedback voltage makes the current flowing through transistors more linearly related to signal input voltage.

Since the transistor 81 provides a constant current load for the discharging current of the capacitor 18, the duration of that part of the cycle in which the transistor 1 is conducting and the capacitor 18 is discharging will be directly proportional to the value of the constant current flowing through transistor 81. Likewise, since the transistor 73 provides a constant current load to the charging current of capacitor 18, the duration of that part of the cycle in which transistor 11 conducts and the capacitor 18 charges will be directly proportional to the value of the current flowing through transistor 73.

The circuits of the prior art, including those to which reference is made above, are dependent for their linearity and temperature stability upon the matching of various circuit elements not only at specific operating points but over a range of temperatures and voltages. Furthermore, the prior circuits are dependent upon the inherent linearities exhibited by the circuit components, linearities which in some active elements depart substantially from those desired. Consequently, it has been proposed to eliminate the necessity for the careful matching of components and for the selection of active elements having very nearly linear characteristics by advantageously employing negative feedback derived by a novel duty-cycle detecting circuit.

The expressions which define operation of the circuits prior to the addition of negative feedback are set forth in the copending application of J. R. Biard, Serial No. 841,553 filed September 22, 1959, and reference is hereby made to that application for discussion thereof.

In reviewing the expressions which define such circuits prior to the addition of negative feedback, it will be noted that in Equation 4 the currents $I_1$ and $I_2$ are respectively dependent upon the coefficients K as well as the $I_0$'s involved. The quantities represented by the term "$I_0$" for various transistors, even of the same type, are not usually identical; and the coefficients represented by K also vary somewhat between selected elements. Consequently, although Equation 5 contemplates the cancellation of differences in the K's of the transistors as well as the changes in $I_0$ with temperature, complete cancellation does not actually occur; and consequently actual circuit operation will differ from that defined by Equation 5 according to the degree by which the K's and $I_0$'s vary as set forth above.

It will now be apparent that prior to the addition of negative feedback the circuits will depart from the desired linear characteristic according to a function of mismatch and of non-linearity of the active elements themselves, and it is for this reason that the selection of active elements is important to the proper functioning of the heretofore proposed circuits. However, as mentioned above, the advantageous inclusion of the unique duty cycle detector and feedback circuits overcomes the need for such selection and matching.

Figure 2:
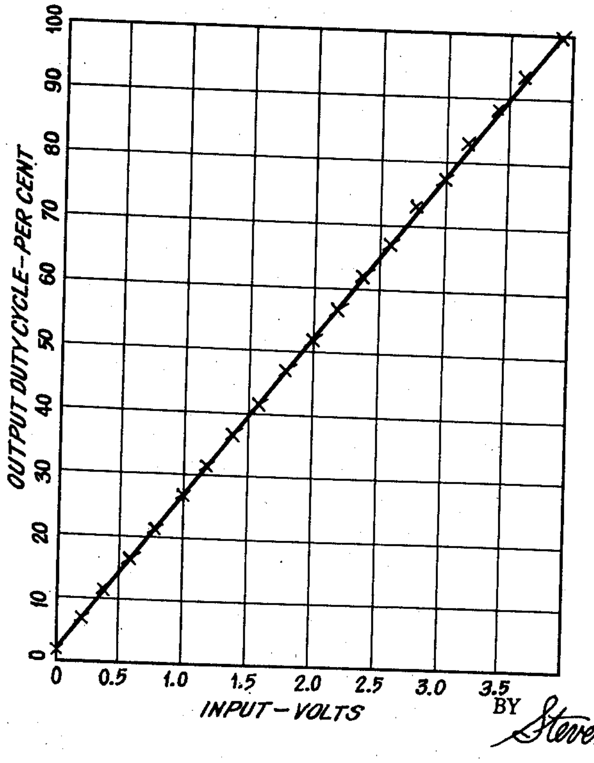
FIGURE 2 illustrates a graph of duty cycle versus input signal voltage for the circuit of the invention.

The high degree of stability and linearity of the circuits is demonstrated by the graph of FIGURE 2 in which the x's indicate the experimental values and the straight line is the best straight line that can be fitted to the experimental data. It is readily apparent from this graph that the operation of the circuits is almost completely linear with input voltage.

The preferred embodiment of the invention as described above makes use of transistors as the active circuit elements. The invention is also applicable to multivibrators in which vacuum tubes or other equivalents of the transistor are used as the active circuit elements. Many modifications may be made to the above described preferred embodiment of the invention without departing from the spirit and scope of the invention, which is limited only as defined in the appended claims.

What is claimed is:

1. A free running multivibrator comprising a pair of transistors, each having its collector electrode connected to a source of potential, a capacitor connected between the emitter electrodes of said transistors, the base electrode of one of said transistors being connected to the collector electrode of the other of said transistors, the frequency of oscillation of said multivibrator being determined by the time required for the voltage across said capacitor to swing back and forth between two values, a differential amplifier comprising first and second transistors, the collector of said first transistor being connected to one side of said capacitor and the collector of said second transistor being connected to the other side of said capacitor, the emitters of said first and second transistors being connected together and to a further source of potential, said first transistor providing a normally constant current load in the path of current flowing into and out of said capacitor when the voltage across said capacitor is changing in one direction, said second transistor providing a normally constant current load in the path of current flowing into and out of said capacitor when the voltage across said capacitor is changing in the other direction, the normally constant currents of said loads being variable differentially in accordance with an input signal applied to the base of said first transistor while maintaining said normally constant currents related to said input signal, and means connected between said pair of transistors and said differential amplifier to generate a voltage proportional to the duty cycle of the oscillation of the multivibrator and to apply said voltage as negative feedback to said differential amplifier to render the relationship between said input signal and the duty cycle substantially linear.

2. A free-running multivibrator adapted to be varied in duty cycle in response to an input voltage comprising:

(a) first and second amplifying devices each having input, output and common electrodes, the input electrode of said second device being coupled to the output electrode of said first device, (b) separate conductive means connecting the output electrodes of said first and second devices to a first source of potential, (c) a capacitor connected between the common electrodes of said first and second devices, (d) a differential amplifier including third and fourth amplifying devices each having input, output and common electrodes, the output electrodes of said third and fourth devices being separately connected to the common electrodes of said first and second devices, the common electrodes of said third and fourth devices being connected together and to a second source of potential, said input voltage being applied to the input electrode of one of said third and fourth devices, (e) said third and fourth devices providing normally constant current loads in the path of current flowing into and out of said capacitor, the normally constant currents in the loads being differentially variable in accordance with voltages applied to the input electrodes of said third and fourth devices, (f) and means having an input coupled to the output electrode of one of said first and second devices adapted to generate a voltage proportional to the duty cycle of the oscillation of the multivibrator and to apply said voltage as negative feedback to the input electrode of one of said third and fourth devices in the differential amplifier to render the relationship between said input signal and the duty cycle substantially linear.

3. A free-running multivibrator adapted to be varied in duty cycle in response to an input voltage comprising:

(a) first and second transistors each having a base, a collector and an emitter, the base of said second transistor being coupled to the collector of said first transistor, (b) separate conductive means connecting the collectors of said first and second transistors to a first source of potential, (c) a capacitor connected between the emitters of said first and second transistors, (d) a differential amplifier including third and fourth transistors each having a base, a collector and an emitter, the collectors of said third and fourth transistors being separately connected to the emitters of said first and second transistors, the emitters of said third and fourth transistors being connected together and to a second source of potential, said input voltage being applied to the base of one of said third and fourth transistors, (e) said third and fourth transistors providing normally constant current loads in the path of current flowing into and out of said capacitor, the normally constant currents in the loads being differentially variable in accordance with voltages applied to the bases of said third and fourth transistors, (f) and means having an input coupled to the collector of one of said first and second transistors adapted to generate a voltage proportional to the duty cycle of the oscillation of the multivibrator and to apply said voltage as negative feedback to the base of one of said third and fourth transistors in the differential amplifier to render the relationship between said input signal and the duty cycle substantially linear.

4. A free-running multivibrator adapted to be varied in duty cycle in response to an input voltage comprising:

(a) first and second amplifying devices each having input, output and common electrodes, the input electrode of said second device being coupled to the output electrode of said first device, (b) means for applying a substantially fixed bias to the input electrode of said first device, (c) separate load impedance means connecting the output electrodes of said first and second devices to a first source of potential, (d) a capacitor connected between the common electrodes of said first and second devices, (e) a differential amplifier including third and fourth amplifying devices each having input, output and common electrodes, the output electrodes of said third and fourth devices being separately connected to the common electrodes of said first and second devices, the common electrodes of said third and fourth devices being connected together and through impedance means to a second source of potential of polarity opposite that of said first source, said input voltage being applied to the input electrode of one of said third and fourth devices, (f) and means having an input connected to the load impedance means of one of said first and second devices adapted to generate a voltage proportional to the duty cycle of the oscillation of the multivibrator and to apply said voltage as negative feedback to the input electrode of the other of said third and fourth devices in the differential amplifier to render the relationship between said input signal and the duty cycle substantially linear.

5. A free-running multivibrator adapted to be varied in duty cycle in response to an input voltage comprising:

(a) first and second transistors each having a base, a collector and an emitter, the base of said second transistor being coupled to the collector of said first transistor, (b) means for applying a substantially fixed bias to the base of said first transistor, (c) separate load impedance means connecting the collectors of said first and second transistors to a first source of potential, (d) a capacitor connected between the emitters of said first and second transistors, (e) a differential amplifier including third and fourth transistors each having a base, a collector and an emitter, the collectors of said third and fourth transistors being separately connected to the emitters of said first and second transistors, the common electrodes of said third and fourth transistors being connected together and through impedance means to a second source of potential of polarity opposite that of said first source, said input voltage being applied to the base of one of said third and fourth transistors, (f) said third and fourth transistors providing normally constant current loads in the path of current flowing into and out of said capacitor, the normally constant currents in the loads being differentially variable in accordance with voltages applied to the base of said third and fourth transistors, (g) and means having an input connected to the load impedance means of one of said first and second transistors adapted to generate a voltage proportional to the duty cycle of the oscillation of the multivibrator and to apply said voltage as negative feedback to the base of one of said third and fourth transistors in the differential amplifier to render the relationship between said input signal and the duty cycle substantially linear.

References Cited in the file of this patent

UNITED STATES PATENTS

| | | |
|---|---|---|
| 2,750,502 | Gray | June 12, 1956 |
| 2,777,951 | Charlton | Jan. 15, 1957 |